(12) United States Patent
Hiraguri

(10) Patent No.: US 9,599,338 B2
(45) Date of Patent: Mar. 21, 2017

(54) COMBUSTION APPARATUS

(71) Applicant: JOINTCOMPANY, KAIRIYUNITY, Nagano (JP)

(72) Inventor: Tatsuo Hiraguri, Nagano (JP)

(73) Assignee: JOINTCOMPANY, KAIRIYUNITY, Nagano (JP)

(*) Notice: Subject to any disclaimer, the term of this patent is extended or adjusted under 35 U.S.C. 154(b) by 444 days.

(21) Appl. No.: 14/220,834

(22) Filed: Mar. 20, 2014

(65) Prior Publication Data

US 2014/0202363 A1 Jul. 24, 2014

Related U.S. Application Data

(63) Continuation-in-part of application No. PCT/JP2012/073757, filed on Sep. 17, 2012.

(30) Foreign Application Priority Data

| Sep. 20, 2011 | (JP) | ................................. 2011-005917 |
| Nov. 10, 2011 | (JP) | ................................. 2011-007042 |
| Apr. 10, 2012 | (JP) | ................................. 2012-089486 |

(51) Int. Cl.
| *F23G 5/24* | (2006.01) |
| *F23Q 25/00* | (2006.01) |
| *F23G 5/50* | (2006.01) |
| *F23G 5/04* | (2006.01) |

(52) U.S. Cl.
CPC ................. *F23G 5/24* (2013.01); *F23G 5/50* (2013.01); *F23Q 25/00* (2013.01); *F23G 5/04* (2013.01); *Y02E 20/12* (2013.01); *Y02E 50/10* (2013.01); *Y02E 50/30* (2013.01)

(58) Field of Classification Search
CPC .................................. F23Q 25/00; F23G 5/50
See application file for complete search history.

(56) References Cited

U.S. PATENT DOCUMENTS

| 2,802,538 A * | 8/1957 | Subarsky .............. B65F 1/1607 169/49 |
| 4,077,387 A * | 3/1978 | Bateman ................... F24B 3/00 126/25 C |
| 4,351,314 A * | 9/1982 | Morton ................... F24B 1/202 126/111 |
| 5,285,736 A * | 2/1994 | Sturniolo .................. F23G 5/50 110/173 A |
| 2003/0134242 A1* | 7/2003 | Hart ........................ F23Q 25/00 431/33 |

FOREIGN PATENT DOCUMENTS

| JP | 58-153020 A | 9/1983 |
| JP | 4746705 B1 | 5/2011 |

* cited by examiner

*Primary Examiner* — David J Laux
(74) *Attorney, Agent, or Firm* — Cantor Colburn LLP

(57) ABSTRACT

A combustion apparatus of this invention comprises: a heat-resistant container having an opening in its upper part; and a pot with a fire-extinguishing lid, provided with a fire-extinguishing lid which can open and close the opening in the upper part of the heat-resistance container, closes the opening with the fire-extinguishing lid by hand, vibration, or impact, and receives a fuel dropped from the heat-resistant container.

6 Claims, 5 Drawing Sheets

COMBUSTION APPARATUS

CROSS-REFERENCE TO RELATED APPLICATIONS

This is a continuation-in-part application of PCT application No. PCT/JP2012/073757, filed on Sep. 17, 2012. Priority under 35 U.S.C.§119(a) and 35 U.S.C.§365(b) is claimed from Japanese Utility Model Registration Application No. 2011-005917 filed on Sep. 20, 2011, Japanese Utility Model Registration Application No. 2011-007042 filed on Nov. 10, 2011, and Japanese Patent Application No. 2012-089486 filed on Apr. 10, 2012, the disclosures of which are also incorporated herein by reference.

BACKGROUND OF THE INVENTION

1. Field of the Invention

The present invention relates to a combustion apparatus.

The present invention is especially applicable to a turbine and a generator using homemade pellets, which unconditionally use high-density and high-thermal-mass pellets, realizing safety of a heat-source-adaptive and heat-resistive furnace and boiler (hereinbelow, called "furnace and boiler") using biomass compost fuel pellet fuel (hereinbelow, called "pellets") and stable supply of high thermal mass, can prepare various power sources by high-temperature high-pressure steam generated by the boiler and furnace, spray of pressure air of an air compressor, an oil steam turbine (hereinbelow, called "turbine"), a high-output power generator proportional to high-speed rotation of the turbine driving, a charger, and a power converter whose rotation is increased by adjustment of back-pressure of an exhaust port and, with a heat exchanger and a thermal energy storage connected to the turbine exhaust port, can be used for hot-water supply, floor heating and cooling, and air-conditioning for cooling and heating by an refrigerant device connected to the temperature retention storage and a motor pump and a blower driven and blowing air by electricity of in-house power generation.

2. Description of Related Art

Although there are various stoves and boilers using the biomass pellets or the like as fuel, any of them cannot freely use high-density and high-thermal-mass green firewood and pellets as a fuel source and is not a system which can be used compositely in an emergency situation. Therefore, generally, the bearing of a steam turbine is special, the shaft is long more than necessary, and the size is large. Consequently, due to a breakage caused by trunk rotation due to centrifugal force, high-speed rotation cannot be performed and the rotation speed is limited to at most about 3,000 rpm. The size is large, the weight is heavy and, moreover, the use is limited to a large power plant or the like. The steam turbine is not suitable for houses and offices in view of size, price, utility value, and cost-vs-price. On the other hand, a gas turbine with low-torque and high-speed rotation and a small gas turbine are popular. Although a pellet-dedicated stove has a catch-phrase that "green" pellets can be used, it is too expensive and is not popular, and the heat quantity of the pellets is low. The stove is of a large size/capacity type and, further, is poor also in cost-effectiveness. As described above, the conventional energy-fuel-related devices can be manufactured/used only in a large plant, and negative production is conspicuous. To reduce the negative production, conventionally, to realize reduction in waste, ecology, and the like, biomass of raw garbage and the like from houses and small-and-medium-sized offices is fermented. As amorphous biomass compost, various composts are known. However, a conventional composting apparatus is large and the system is too complicated to operate. It is too expensive to use in houses and small-and-medium-sized offices, is difficult to use and, moreover, the maintenance cost is too high. In spite of the problems, attention is paid to the idea of pelletizing raw garbage and using pellets as fuel and compost. An apparatus which does not make waste from houses and offices industrial waste and has more cost-effectiveness is demanded as a separate small type for each house and each office, and higher heat quantity is requested. By simultaneously using various composite mechanical devices whose heat source is the furnace and boiler for the biomass high-density and high-thermal-mass pellets, the energy is converted to electric energy of an ultra-compact high-output turbine, in which the energy is composite, increased, and retained. Thus, the cost-effectiveness is very aspired and expected, and the use expands.

In relation to the present invention of green boiler fuels, a method of forming a homemade green pellet of high density and high thermal mass as described above is disclosed in JP 2011-251888 A.

BRIEF SUMMARY OF THE INVENTION

According to the present invention, a combustion apparatus is provided with comprising a heat-resistant container having an opening in its upper part; and a pot with a fire-extinguishing lid, provided with a fire-extinguishing lid which can open and close the opening in the upper part of the heat-resistance container, closes the opening with the fire-extinguishing lid by hand, vibration, or impact, and receives a fuel dropped from the heat-resistant container.

The fuel is preferable to be a biomass pellet fuel obtained by processing dry biomass compost which is derived by fermenting biomass and whose water content is 10 to 20 weight % into a pellet shape.

The pot with the fire-extinguishing lid is preferable to have a safety stopper for introducing air to re-burn the fuel dropped from the heat-resistance container.

A pellet-shaped capsule made of a holed metal housing an ignition agent containing polypropylene to ignite the fuel in the pot with the fire-extinguishing lid may be used.

The present invention is applicable to a large-capacity electric manufacturing apparatus of a high-output power generator with high torque (effect of power of rotation about the shaft and the moment of power) and high-speed rotation by the turbine which is small.

The present invention is applicable to a turbine and power generator apparatus of the above-described is provided.

The present invention may be used as a mini-plant apparatus in which a furnace and a boiler are integrated and can be integrally operated without performing composite individual operation on the furnace and the boiler, comprising (1) an air conditioner and a heat retention storage using thermal mass of the boiler, (2) a turbine by high-temperature high-pressure steam of the furnace and boiler using pellets, nozzle injection pressure by high-pressure air and oil high heat energy of an air compressor, and back-pressure adjustment of a turbo outlet, (3) a high-output generator capable of further increasing green energy, and (4) a mini-plant apparatus capable of performing adjustment of energy of the furnace and boiler, the turbine, and the power generator for the high-density high-thermal-mass pellets and conversion and continuous supply of electric energy.

(1) Air Conditioner/Heat Retention Storage

In a composite system capable of maintaining high temperature by sufficiently driving a spray-discharge nozzle of an air compressor disposed in the boiler, the boiler using the furnace and boiler for pellets as the heat source, an electric heater radiation heat source assembled device in the boiler, and a floor cooling/heating and hot-water supply device and an air conditioner using heat in a heat retaining storage connected to the heat exchanger connected to the turbo exhaust port, to assemble the devices, a radiation spiral-shaped pipe in a part of a hot-water heat-retaining storage having therein the radiation spiral-shaped pipe connected to the exhaust port of the heat exchanger is doubly and hermetically covered with a radiation spiral pipe having an outside diameter larger than the pipe, an internal liquid is similar to liquid in a center pipe, a double structure of the pipe having high thermal conductivity is obtained, thereby obtaining high radiation conductivity of the liquid and an effect that heated liquid does not easily get cold, the pipe is not easily subjected to influence of fluctuating temperature in the heat-retaining storage and keeps on radiating, further, an event of replacing a large amount of cooling water in the hot water in the heat-retaining storage can be handled by a heating amount obtained by adding heating of the radiation spiral pipe of the heater in the heat-retaining storage with a temperature sensor of high-output electricity of the power generator and heating of the boiler in the furnace and boiler.

With the configuration, in a state where the temperature of the liquid in the center pipe is retained, in fitting equipment of hot-water supply by sustainable hot-water heat retention, hot water supply, hot-water distribution by a floor heating/cooling device, piping in the heat retention storage, and water supply and drainage port, a floor heating/cooling device is provided. A heat exchanger connected to the floor heating/cooling and hot water supply device, a refrigerant device connected to the exhaust port of the heat exchanger, and a cooling/heating air conditioner driven by electricity generated by the heat generator are provided. Protection of drop in the protection temperature of the cooling/heating air conditioner is divided into a device excluding the hot-water supply device lying out of the automatic heating device adjustment range of the system and a device which does not exceed the range.

The first is an automatic electric power driving generator incorporated air conditioning/heat retaining device, in which since an internal power generator obtained by excluding a heat retention storage hot-water supply device can drive directly, efficiently, and smoothly automatic electric power in equipment, the temperature in the heat retention storage can be assured by using battery electricity only at the time of start or low-speed rotation of the turbine by automatic adjustment of the electric heater as the heat source of the boiler similar to the idling state of an internal combustion engine, high-output electric energy can be obtained in short time, electric output adjustment is also possible, by directly consuming homemade electric energy in the electric power, it becomes unnecessary to receive external electricity, so that the battery can be made lighter and smaller, and the use electric energy in each of the devices is also supplied in the in-house power generator using any of the apparatuses to be described in (3) and (4) later in which the high-output electric energy adjusted and sustained is assembled in the electric power device.

The second is an automatic electric power driving generator incorporated air conditioning/heat retaining device, in which the apparatuses (3) and (4) to be described later provided with the heat retention storage hot-water supply device are, as the above-described automatic electric power driving device in which the apparatus (4) is incorporated, a metal-pellet-type ignition device of automatically dropping the pellets as fuel of the furnace and boiler for the biomass pellet fuel at the maximum of the electric heater in the boiler to safely and reliably ignite a fire, combustion is maximized easily and safely, the electric heater in the heat retention storage is maximized to compensate decrease in cooling water injection temperature in short time, to drive the apparatus described in any of (3) and (4) assembled in the automatic electric power device, not only the internal electric power energy of itself but also use electric energies are also supplied by a power generator.

(2) Turbine

Positive sides and negative sides when the furnace and boiler using pellets as the heat source of the furnace are used as a heat source will be listed and compensated.

1. A positive side of performing a drive using the liquid generated as a steam of the turbine as a lubricant oil is that a special bearing part of the turbine can be made simple, plain, short, small, and lubricant, and ultra-compactness and higher speed is realized.

2. A negative side is that, since the lubricant oil of the turbine has viscosity, and the lubrication performance of the oil decreases in a state where the water content is equal to or less than 50% and the oil is at high temperature and is boiling. To avoid it, an oil to which a few percent of silicon is added is used and, further, the oil is sprayed in a mist state by the compressor multipole spray nozzle in the boiler just before it boils. High rotation can be realized by the high-temperature, high-pressure, and expanded steam energy of the heated oil by the spray nozzle in the boiler of the air compressor together with high-temperature mist-state air high-pressure in the spray state. Further, to stably compensate the air compressor, an auxiliary air tank is provided in front of the output discharge port of the air compressor separately from the air compressor so that the pressure/transmission amounts of the circulation oil and air are sufficiently complementary to each other by adjustment of a branching/distributing device.

3. To increase the rotational speed of the turbine, a back-pressure adjustment port device is provided for the exhaust port of the turbine.

4. By using the outer ring of a turbine rotor blade as a flywheel, the rotational speed can be increased dramatically. By preparing the above four points and performing adjustment, the basic rotational speed of 30,000 rpm or higher can be sufficiently assured. The turbine apparatus can convert and increase the energy to high-output electric energy proportional to the high-speed rotational kinetic energy generated by the ultra-compact axial-flow, multistage, oil steam turbine method (the definition of axial flow is a method of obtaining energy by the turbine blade while steam flows in a direction parallel to the rotary shaft, since the centrifugal force is added in the longitudinal direction of the rotary blade, engineering constraints are relatively small, the definition of the reaction method is that the pressure of the steam and the oil energy are converted to kinetic energy also in a moving blade, using also the reaction force of the steam and mist-state oil ejected from the moving blade, the rotational force (torque) is generated. Although a heat drop per stage is small and the number of stages is large, the blade is smaller).

(3) High-Output Generator

The high-output electricity generated by the power generator driven by the high-speed rotation turbine by the furnace and boiler using the pellets is supplied via a power converting device to various voltage sources. A specified voltage of the in-house power generator which converts and increases the energy to high-output electric energy proportional to high-speed rotational kinetic energy generated by the turbine capable of using selective charging is high voltage of 1,000 V. However, low current is set, and the thickness of the winding is not increased, and output is high. As a form of providing winding coil 32 poles in a multipole 32-pole series and providing neodymium magnetic core 32 poles in two lines in the same cylinder of 16-pole parallel lines, the form is switched to 16 poles by the power converting device. The phase can be switched between three phases and a single phase. By directly connecting the rotary shaft of the core part to the turbo to drive the turbo at the turbo rotational speed of 30,000 rpm or higher as a reference, the power generator generates high-output power generation energy of 300,000 W or higher. The power generator device can supply the low-output or high-output electricity generated by the power generator as various powers via the power converting device and can decrease or increase to high-output electricity energy which is proportional to the high-speed rotational kinetic energy generated by the turbine capable of using selective charging.

Disposal of raw garbage and the like in houses and offices is a social issue (economical issue, environment issue, and the like) struggled to be solved in municipalities. However, since all of plants are large, it is uneconomic and, rather, may cause environment destruction. The present invention, therefore, is achieved in consideration of such circumstances. It is also possible to mass-produce biomass of raw garbage, fallen leaves, sawdust, weed, newspaper, magazines, and the like from houses and offices by purposes safely and easily at each house or office when an oil jack of a manual method 10T of an apparatus disclosed in JP 2011-251888 A can be used in place of an oil cylinder of the electric method 10T. Consequently, the biomass can be preferably converted to dry compost pellets stably throughout the year and can be used as the fuel of the furnace and boiler using the high-density and high-thermal-mass biomass compost fuel pellets, so that it is more environmentally friendly. The furnace and boiler for pellets can easily operate the mini-plant apparatus together with the boiler. The devices capable of providing floor and air-conditioning cooling and heating and hot-water supply connected to the boiler assembled device and the temperature retention storage and the turbine and the power generator are made complex, coupled, increased, independent, and developed. Particularly, the drawbacks of the steam turbine are that size is large, the axis is long more than necessary, a special bearing is also necessary as a bearing, and the rotational speed which is demanded to be high is at most about 3,000 rpm. If the rotational speed increases, and the shaft of the trunk is broken due to the centrifugal force and is blown up and broken by steam of boiling water. Under present circumstances, the turbine can be used limitedly.

As a result of keen study to solve the problems, with an easy and simple system in which high-density and high-thermal-mass pellets in the above-described can be stably supplied as a thermal source, power of conventional fossil and electric energy is abolished and replaced with a power generator compositely by the furnace, boiler, and turbine driving. Consequently, since the pellets of high density and high thermal mass can be supplied directly, the turbine and power generator of the furnace and boiler using the pellets are realized.

(4) Mini-Plant Apparatus

By integrating the furnace and boiler for the pellets described in any of (1) to (3) and by performing simultaneous complex by cooperation with various increasing devices, as a heat source of a simple system, the precious high-density and high-thermal-mass pellet energy is converted and increased to a plurality of capacities of infinite energy from the energy capacity using the state where pellets of once of combustion on the grating in the diagram at the boiling point of the boiler as 1 (obviously, the work from the air pressure spray nozzle). The combustion of once in the furnace and boiler of the high-density and high-thermal-mass pellets can be infinitely increased, and there is an excess. Consequently, even when additional supply of the pellets is stopped, if the in-house power generation starts, by operation of the temperature sensor provided in the furnace and boiler, the electric heater provided in the furnace and boiler using pellets using high-power electricity typified by residual energy of the various energy increasing devices can perform sustainable energy supply. When the pellets are loaded and combustion starts safely and easily in a pellet-type ignition device made of metal, sustainable energy is supplied like the above-described energy combustion. The heater is automatically cancelled by the internal sensor or low-output electricity of low-speed rotation similar to an idling state of an internal combustion engine is addressed by automatic temperature adjustment, thereby maintaining the temperature of hot water in the temperature retention storage. Therefore, the maximum speed rotation of the turbine can be always realized, and the high-output electric energy can be created. Even in the case where the electricity cannot be made close to the idling state, particularly, in the case of automatic electric power in short time, the power is driven by a battery, the furnace and boiler using the high-density and high-thermal-mass pellets are automatically ignited by a safe and easy ignition device of the metal pellet type in short time. The turbine can be rotated at high speed, and high-output electric energy can be created. Even when there are variations in raw garbage generated from each unit of houses and offices, energy supply of pellets can be uniformly averaged and stabilized without exaggerating the energy supply of pellets. By individually disposing raw garbage in each unit of houses and offices without making it as industrial waste, the devices illustrated in JP 2011-251888 A are combined, so that mini-plant energy production in each unit of houses and offices enables complication, thereby producing cost effectiveness. Particularly, in an automatic electric power apparatus, an in-house power generation can operate independently, so that it becomes unnecessary to stop the power each time and rapidly charge the apparatus for long time, and a heavy and large charger can be made lighter and smaller. Therefore, the present invention provides a mini-plant apparatus of converting and increasing the energy, so as to be adjustable and sustainable, of the furnace and boiler for the high-density and high-thermal-mass pellets, the turbine, and the power generator energy, which enables green, slow, and rich life, and the energy is supplied more stably from the viewpoint of environment, defense, economy, finance, foreign diplomacy, resource, and industry.

The base of energy in the present invention can be self-sufficient in the country without depending on the existing fossil fuel and the like. A complex increased apparatus which is integrated and easy to operate is a mini-plant apparatus, using the pellets described in JP 2011-251888 A made by the biomass compost fuel pellet in-house forming apparatus every separate unit, which is useful for reduction in garbage and protection of environment, and is not a one-point-concentrated large plant. The apparatus uses, without depending on the existing fossil and electricity energy, high-cost-effective, high-density, high-thermal-mass, and green pallets and the energy of the mini-plant apparatus of the furnace and boiler, the turbo, and the power generator. If issues in environment, fuel, and economy and, also, issues on global and international disasters may come from the high-degree infrastructure development we are accustomed, energy production of another way in the case of emergency as a preparation just in case can be prepared. The present invention relates to a turbine power generator of a furnace and boiler for the high-density and high-thermal-mass pellets by which we can enjoy environment-friendly and rich life, raw garbage in each of houses and offices can be prevented from becoming industrial waste, using energy for one combustion of the furnace and boiler for the high-density and high-thermal-mass pellets made by the biomass compost fuel pellet in-house manufacturing apparatus as one capacity, by using energies simultaneously, the energy can be infinitely increased to a plurality of capacities of the energy, and cost efficiency can be sustainably expected.

BRIEF DESCRIPTION THE SEVERAL VIEWS OF THE DRAWINGS

Specific embodiments of the present invention will now be described, by way of example only, with reference to the accompanying drawings in which.

DETAILED DESCRIPTION OF THE INVENTION

Hereinafter, the pellet furnace and boiler of the present invention will be described in detail. The furnace and boiler for the high-density and high-thermal-mass pellets are requested to be a composite safety system. The furnace and boiler for the high-density and high-thermal-mass pellets are easily and simply integrated without any difficulty and are in a form that a mini-plant can be easily operated. The furnace and boiler dedicated to pellets are environmentally friendly, resistive to high temperature, small, and simple as illustrated in FIGS. 1, 2, 3, 4, 5, 6, and 7. Moreover, the furnace and boiler for pellets are devised to realize safety as follows:

1. The furnace and boiler are made of a heat-resistant material, and a pellet ignition device has a metal-made pellet shape and can ignite safely, promptly, and reliably;

2. At the time of earthquake-resistant impact, things for making a fire drop, and a fire-extinguishing lid automatically rises together with a grating and automatically closes an air open/close adjustment port, thereby extinguishing fire by sealing;

3. When the turbine starts fully, the fire in the furnace is dropped automatically/manually and can be switched to an electric heater in the boiler;

4. A sensor for automatically switching temperature in the boiler is provided internally;

5. A pressure-spraying multipole nozzle of an air compressor changes heated oil accidental energy to mist together with steam; and 6. A pressure sensor in the boiler is provided internally.

The fuel used in the present invention, particularly, pellets are automatically selected and limited in high density and high thermal mass. Therefore, fuel from which dioxin which is toxic and heavy metal is not removed and excessive fuel are also mixed. For example, radiation-contaminated biomass which is not decontaminated is limited. In the case where biomass which is excess or is not limited, since the fuel use amount is originally small in a mechanical increasing apparatus according to this invention, it is preferable to use, as the thermal mass, carbon fuel, coal, kerosene, gasoline, and gas in a relative balance range which does not exceed the use amount of pellets. However, the pellets disclosed in JP 2011-251888 A can be designated as use fuel since they satisfy all and are not selected and limited.

Figure 1:
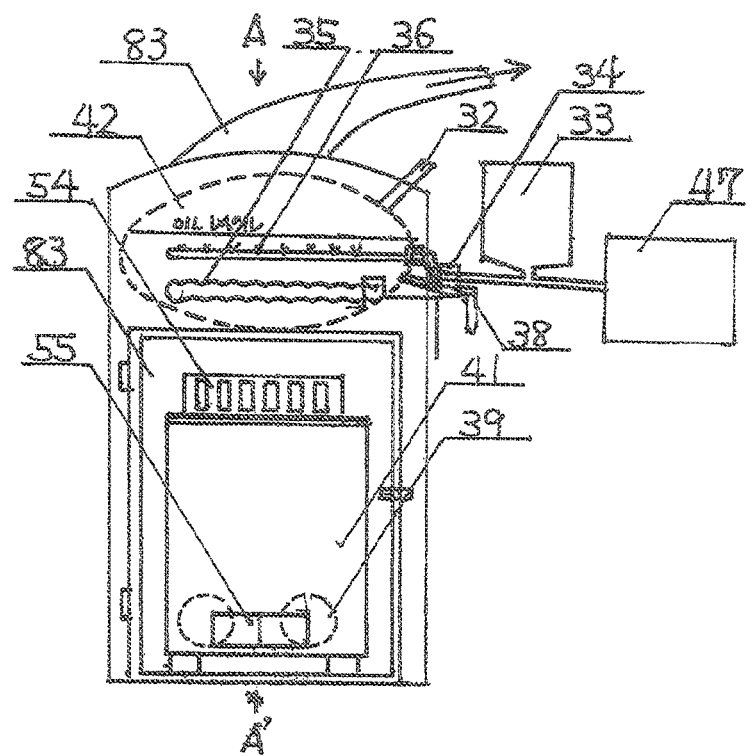
FIG. 1 shows a front view of a furnace and boiler of the present invention.
Figure 2:
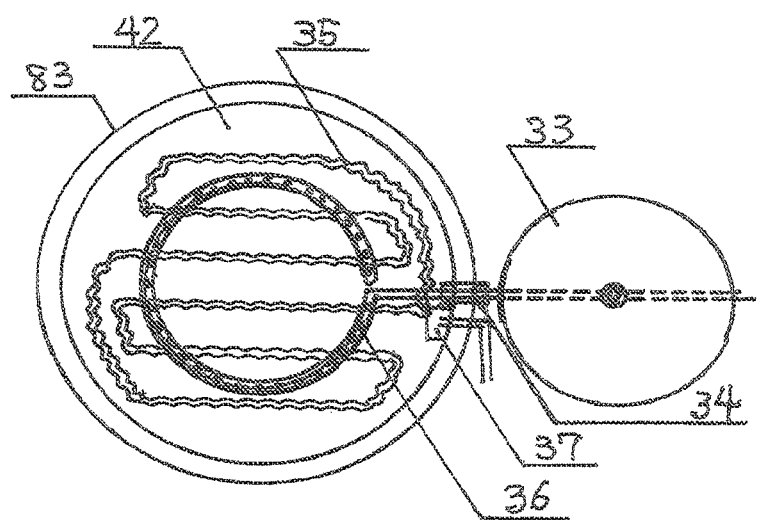
FIG. 2 shows a plan view of a boiler in the furnace and boiler of the present invention.
Figure 3:
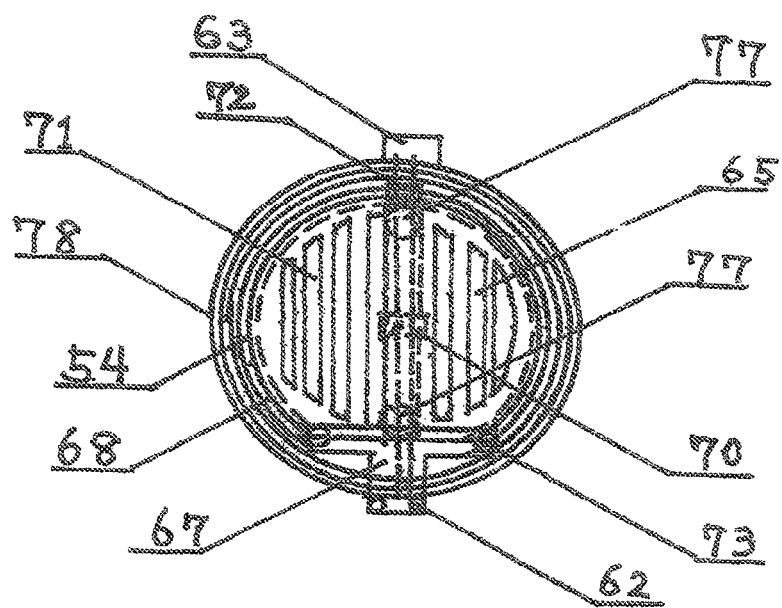
FIG. 3 shows a plan view of a furnace of the furnace and boiler of the present invention.
Figure 4:
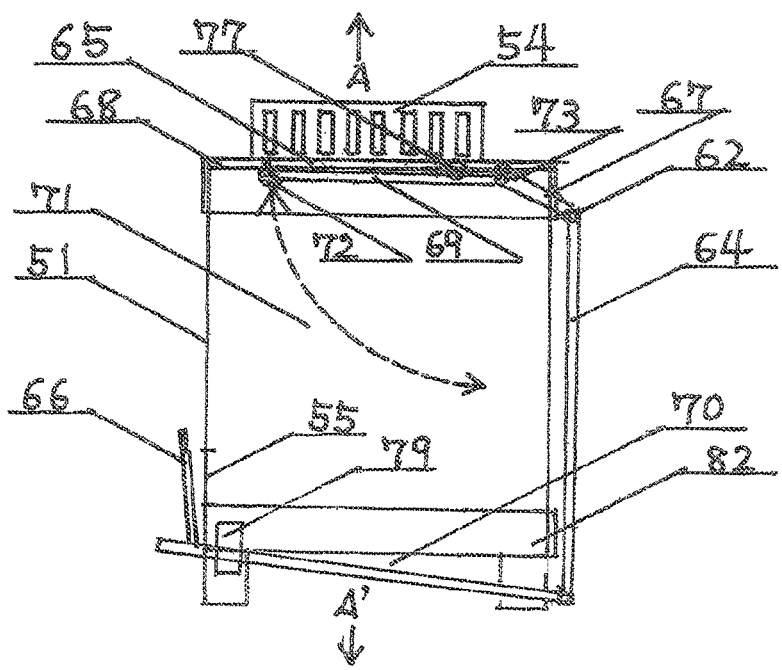
FIG. 4 shows an A-A' side cross section in which a handle for a check of the furnace in the furnace and boiler of the present invention is released.
Figure 5:
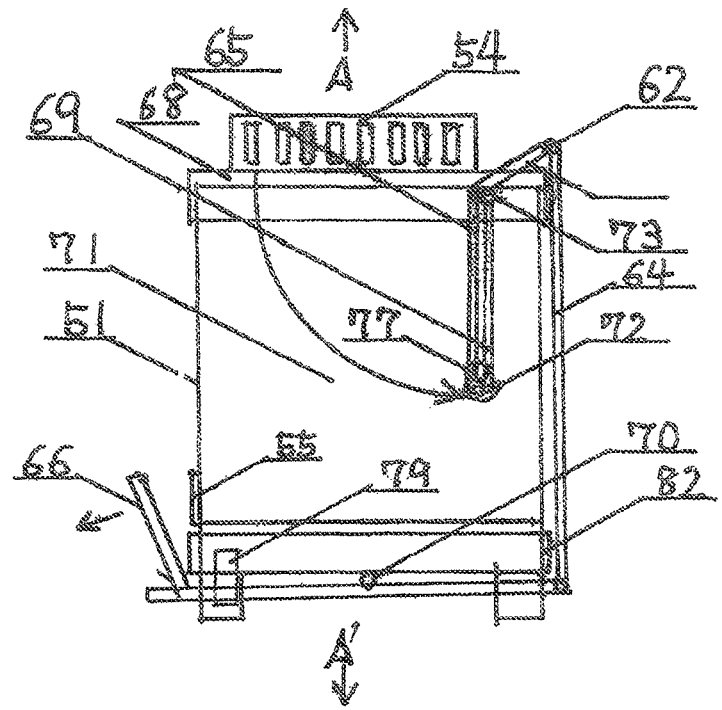
FIG. 5 shows an A-A' side cross section in which the handle for a check of the furnace in the furnace and boiler of the present invention is pulled.

Hereinafter, an embodiment will be described according to reference numerals in the appended drawings. FIGS. 4 and 5 are side cross sections taken along line A-A', illustrating an embodiment of the furnace and boiler for the high-density and high-thermal-mass pellets of the present invention. Illustrated in any of FIGS. 1, 4, 5, and 6 are a heat-resistance charcoal-extinguisher and furnace 51, an air-holed saucer 54 for biomass pellet fuel, a furnace automatic air adjustment port 55, an adjuster joint 62 for a fire-extinguisher drop-lid, a fire-extinguisher drop-lid adjustment weight (heavier than the saucer, fire-extinguisher lid, and fuel in 54 joint casting rod 64, a casting grating 65 having a structure integrated with a joint 67, an auxiliary handle 66 of an automatic/manual handle of 63, the fire-extinguisher lid/grating universal joint 67 (which makes seesaw and upward/downward movement in a hinge 73 of an adjuster of the fulcrum of the grating, joint, and fire-extinguisher lid of the integral structure), a grating/fire-extinguisher lid adjuster 68, a lid 69 which becomes a fire-extinguisher lid by pulling up the dropped lid together with the grating (by a fire-extinguishing-lid universal fitting/universal cancelling device 72 of the grating) (the lid is a simple universal lid until it performs lifting with a grating universal fitting 72 and is positioned just below the adjuster 68 to hermetically close a fire-extinguishing pot and furnace 71), a fire-extinguishing-lid adjuster joint fulcrum 70, the fire-extinguishing pot and furnace 71, the fire-extinguishing-lid universal fitting 72 of the grating, which also has a device of automatically cancelling a safety stopper 79, and the hinge 73 of joint between the casting grating 65 and the fire-extinguishing lid/grating universal joint 67. In FIG. 4, the casting grating 65 is swingably attached in the hinge 73 of the adjuster at the fulcrum of the casting grating 65, the fire-extinguishing lid and grating universal joint 67, the grating and the joint and fire-extinguishing lid. Usually, when a force works downward in the diagram on the fire-extinguishing lid and grating universal joint 67 by the gravity of the joint casing rod 64 which is heavier than the total weight of the casting grating 65, the fire-extinguishing drop-lid 69, and the fuel of 54, the shape of the casting grating 65 cut by the grating and fire-extinguishing lid adjuster 68 accurately fits (in a predetermined position in the frame of the grating). Consequently, the fire-extinguishing lid 69 is fixed so as to rise just below the adjuster by the fitting 72, so that the furnace air adjustment port 55 is automatically closed, and a fire-extinguishing pot state is obtained.

The furnace and boiler for the high-density and high-thermal-mass pellets illustrated in FIGS. 1, 3, 4, 5, 6, and 7 is an apparatus which is put in the air-holed saucer 54 for pellets, the fire-extinguishing lid 69 is released by the universal fitting 72 so that the grating 65 is lightly dropped manually or the fitting 72 is automatically released to drop in the fire-extinguishing pod and furnace 71, the furnace air adjustment port 55 is automatically opened to drop the pellets therein, further, a pellet-shaped steel ignition capsule which is a safe and reliable ignition device (will be described eater) is dropped to be burned.

In the case where the user wishes to interrupt the use, the stopper 79 illustrated in FIGS. 4 and 5 is released or a metal ball of an aseismic device 77 operates the universal cancelling device 72 to cancel the stopper 79 so that the biomass pellet fuel which is burning is dropped into the fire-extinguishing pot 71. When the fire-extinguishing lid 72 automatically rises to hermetically close the fire-extinguishing pot and furnace and 55 is automatically closed, fire can be extinguished. That is, either by automatically or pulling the handle of the drop-lid adjuster 63 for extinction or by the earthquake-resistant impact device 77, the weight of the casting and iron rod 64 is heavier than the total weight of the grating 65, the fire-extinction drop lid 67, and the fuel in 54, or when the weight becomes heavier, further in addition to the total weight, by the metal ball 77 of the earthquake-resistant impact device whose weight temporarily increases to double by the moving fall load of the metal ball 77, the joint casting and iron rod 64 which becomes lighter moves upward by any of the reasons in the diagram and the fire-extinction drop-lid adjuster joint 62 and the fire-extinction drop-lid and grating universal joint 67 move upward in the diagram, the casting grating 65 fixed so as to be positioned below the grating and fire-extinction lid adjuster 68 turns downward in the hinge 73 of the adjuster at the fulcrum of the grating and joint and the fire-extinction lid, and the state illustrated in FIG. 5 is obtained. Therefore, the fuel pellets in the air-holed saucer 54 on which the biomass pellet fuel is put drop into the fuel-extinguishing pot. By the gravity of the joint casting and iron rod 64 whose weight becomes heavier by the reduced amount of the weight total when the fuel and the drop load of the metal ball 77 return to the original state, 65 integrated with the joint 67 which moves downward with the joint 62 rises like a seesaw around the hinge 73. When 65 automatically closes the air adjustment port 55 in a state where it catches the fire-extinguishing lid 68 by 72, an air-tight state is obtained. Since oxygen is insufficient in the fire-extinction pot, fire is extinguished. This drop, rise, close, fire-extinction pot state will be described more specifically with reference to the above-described with referring to FIGS. 4 and 5.

In FIG. 5, when the user loses his/her grip from the handle 66 of the fire-extinguishing drop-lid adjustor, the joint casting rod 64 having the weight of the fire-extinguishing drop-lid adjuster (heavier than the grating) moves downward due to gravity in the diagram, the fire-extinguishing drop-lid adjuster joint 62 and the fire-extinguisher lid/grating universal joint 67, in the diagram, an integral structure of 67 and 65, make seesaw and downward movement using the hinge 73 as a fulcrum, so that the casting granting 65 and the grating universal fitting 72 of the fire-extinguishing lid are fixed in a predetermined position in a frame and just below the grating/fire-extinguishing lid adjuster 68, to assure further safety, the safety stopper 79 is put. When the air opening/closing automatic adjustment port 55 is closed, fire is extinguished. On the contrary, when the automatic adjustment port 55 is opened, the fire-extinguishing lid automatic fitting 72 is opened, and the fire-extinguishing lid 69 is dropped in 71. When the safety stopper 79 is opened, ignition and combustion can be performed as described above.

The biomass pellet fuel dropped in the fire-extinguishing pot 71 and subjected to fire extinction can be reused. The pellets made by the biomass compost fuel pellet self-manufacturing apparatus disclosed in JP 2011-251888 A are high-density and high-thermal-mass pellets which are not easily ignited but the thermal mass is high. Consequently, it is preferable to use a pellet-shaped steel ignition capsule ignition device described above, in which polypropylene as a material is housed in a holed metal pellet-shaped capsule. Also from the safety point of view, the device has to be safely stored independently and should not be stored together/integrally with an inflammable material such as a pellet. Since the ignition device singularly passes through an automatic ignition/drop device, it is protected (so that fire is not diffused or scattered like fireworks) in a holed metal pellet shape having the necessary maximum size, and is singularly used.

In the furnace and boiler for homemade pellets illustrated in FIGS. 1, 3, 4, 5, 6, and 7, high-density and high-thermal-mass pallets are used as a heat source of energy which increases using the energy for loading of once of combustion as energy capacity 1 in the air-holed saucer 54 for the pellets, lubricant oil is used as liquid in the boiler. Since cover direct attachment 87 of the bearing part of the turbine driven by the oil steam pressure generated in the furnace and boiler and the air spray pressure can be performed, it can become simple, easy, small, and lubricant. As the high-speed rotation of the ultra-compact axial-flow, multistage, oil steam turbine is generated, by the in-house power generator which converts the energy to high-output electric energy 300,000 W or higher proportional to high-speed rotational kinetic energy 30,000 rpm generated by the ultra-compact axial-flow, multistage, reaction oil steam turbine 43 realizing ultra-compactness and higher speed, the heat exchanger connected to a steam exhaust port 89 of the turbine, and electricity generated by the in-house power generator:

First, by simultaneously combining the related devices as the heat source at the boiling point state of the boiler, the energy can be converted and increased to a plurality of capacities of energy. Thus, even when insufficiency, forgetfulness, or the like in supply of the pellet source occurs, also by assistance of complex energy retention and increase represented by the hot-water and liquid retaining storage in a self-completion manner, the power source is used as it is as the high-output power source. By adjustment of the output of the high-output electric heater with the sensor in the boiler 42, output can be freely generated from a low output similar to an idling state of an internal combustion engine to a high output as maximum, so that the supply of high-output electric energy is adjusted, combined, and sustained, and residual electricity can be distributed or sold.

Second, the battery 49 is charged with electricity by a power converter 50 and further converted to respective power sources via the power converter. Therefore, the in-home power generator can use the electricity in a self-completion manner. The power generator and cooling/heating air conditioner has the cooling/heating air conditioner such as a series of the furnace and boiler, the turbine, the heat exchanger, and the hot-water retention storage which are driven and supported.

Figure 6:
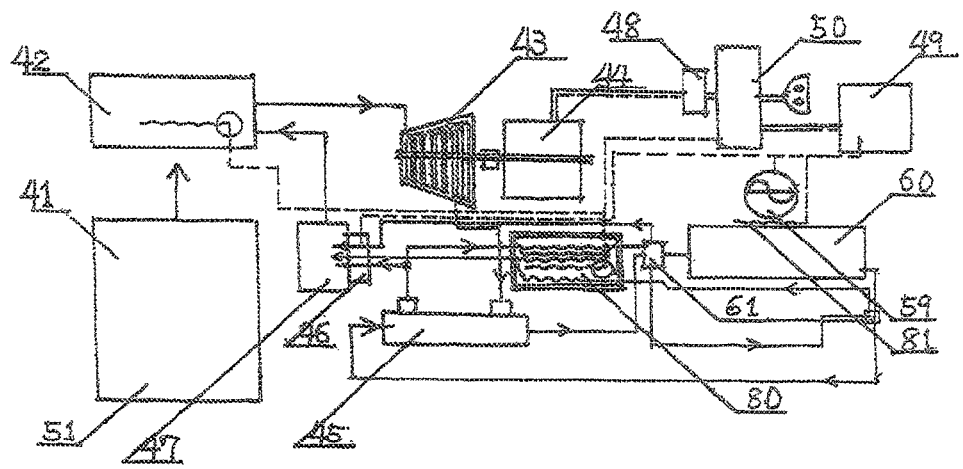
FIG. 6 shows a plan view illustrating an embodiment of an energy complication, increase, adjustment, retention, and sustention power-generation mini-plant system of the present invention.
Figure 7:
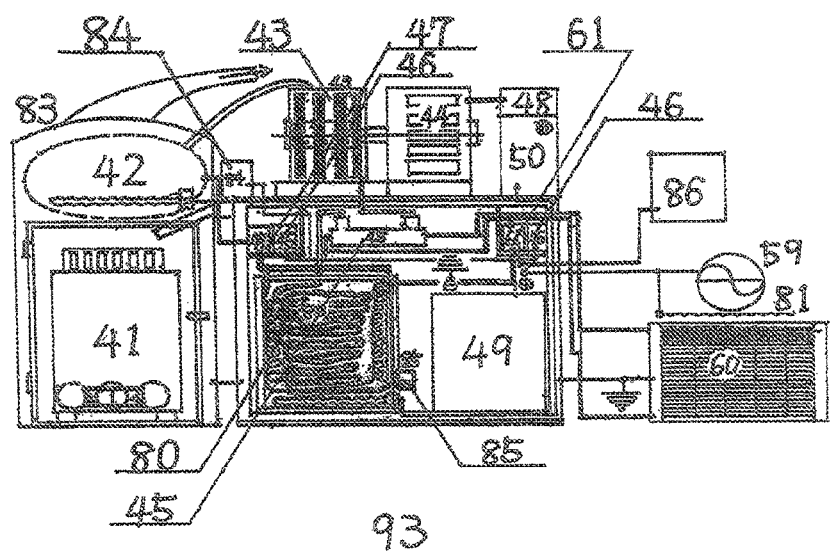
FIG. 7 shows a plan view illustrating shapes and structures of the schematic diagram of the devices in FIG. 6 of the present invention, compact mini-plant electric power assembly, fixed schematic structure, and shapes.

FIGS. 6 and 7 are schematic, shape, and structure diagrams of a power-generation and cooling/heating air-conditioner apparatus of the present invention. In the diagrams, by heat generated by the furnace and boilers 41 and 42 for homemade pellets using high-density and high-thermal-mass pellets, by high-temperature and high-pressure steam of a liquid housed in the boiler 42 (lubricant oil to which silicon is added by a few % to prevent boiling and to increase lubrication performance) and an oil circulation air compressor 47, the oil becomes a mist state by an air injection nozzle 36. By the oil energy and the compression vapor energy of the compression air, the ultra-compact, axial-flow, multi-stage, and reaction oil steam turbine 43 is rotated at high speed, and high-output power generation of 44 is carried. The obtained electricity is used as respective power supplies. By the residual electricity, also when the heater provided in the boiler 42 operates, sustainable complex and temperature automatic adjustment use are enabled, and charging and electric power selling are performed. By a hot-water storage 80, a hot-water-supply, floor, air-conditioning, and cooling and heating 60 is sufficiently supported. Illustrated in the diagrams are the furnace and boiler 41 for high-density and high-thermal-mass pellets, the boiler 42 with the temperature automatic adjuster, the ultra-compact axial-flow, multistage, and reaction oil steam turbine 43, the high-output power generation of 44, a heat exchanger 45, an electric motor 46 (power is of the self-contained type), a compression circulation pump (air compressor) 47, a safety device 48 for charging residual power, a charger 49, a power converter 50, a boiler-built-in lubricant oil filter and drain port 85 for replacement, a cooling-water auxiliary tank 86 for cooling, and an automatic power-incorporated fixed mini-plant apparatus 93 of the home power generator.

The present invention is applicable to a heat-source-adaptive heat-resistant furnace and boiler for homemade biomass pellets, using a biomass pellet. The furnace and boiler for both an earthquake-resistant impact device and a fire-extinguishing pot, including a fire-extinguishing lid opening/closing mechanism which automatically/manually couples the handle, an earthquake-resistant impact device, a pot with a fire-extinguishing lid to a heat-sensing control provided in the boiler, wherein the furnace and boiler are environmentally friendly, resistive to high temperature, small, and simple as illustrated in FIGS. 1, 2, 3, 4, 5, 6, and 7, and the furnace and boiler for pellets are devised to realize safety as follows; 1 the furnace and boiler are made of a heat-resistant material, 2 At the time of earthquake-resistant impact, after things for making a fire drop, a fire-extinguishing lid automatically rises together with a grating and automatically closes, subsequently, an air intake port is automatically closed, thereby extinguishing fire by sealing, 3 when the turbine starts fully, the fire in the furnace is extinguished automatically/manually and can be switched to an electric heater in the boiler, 4 a sensor for automatically switching temperature in the boiler is provided internally, 5 a pressure-spraying multipole nozzle of an air compressor changes heated oil accidental energy to mist together with steam, 6 a pressure sensor in the boiler is provided internally, and 7 by operation of the earthquake-proof impact device as the furnace and boiler for biomass pellet fuel or automatic/manual operation of the handle, through the fire-extinguishing lid opening/closing mechanism, the furnace opening/closing state by the fire-extinguishing lid and the boiler are integrally controlled as a mini-plant apparatus.

Figure 10:
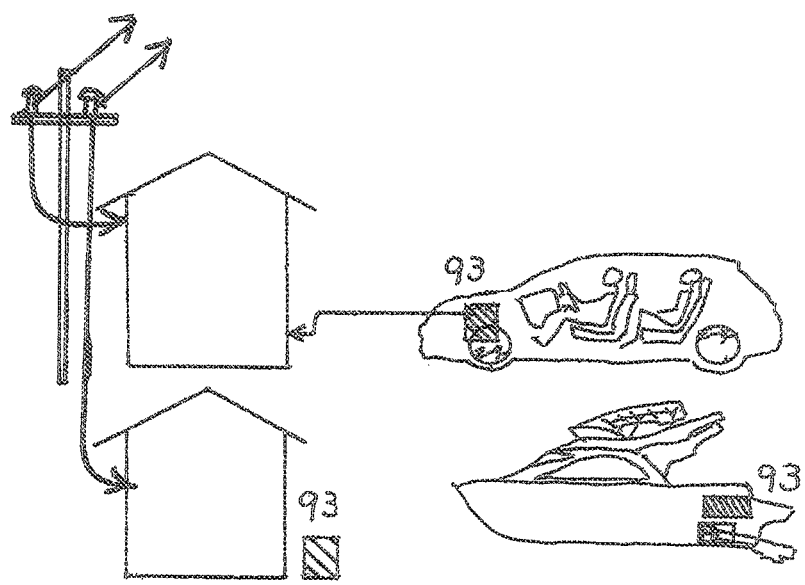
FIG. 10 shows a concept diagram of electricity supply and power transmission of a turbine/power generator mini-plant of the present invention.

The present invention is also applicable to a turbine automatic power generator apparatus wherein a battery is formed lighter and smaller and charged from the outside so that there is no time loss caused by the charging, by using electricity of power generated by a power generator directly or through a battery charger 49 or a power converter 50, directly as a power source, by mechanical, electrical, power, and power-generating devices, or directly for an automatic electricity power (FIG. 10).

Figure 8:
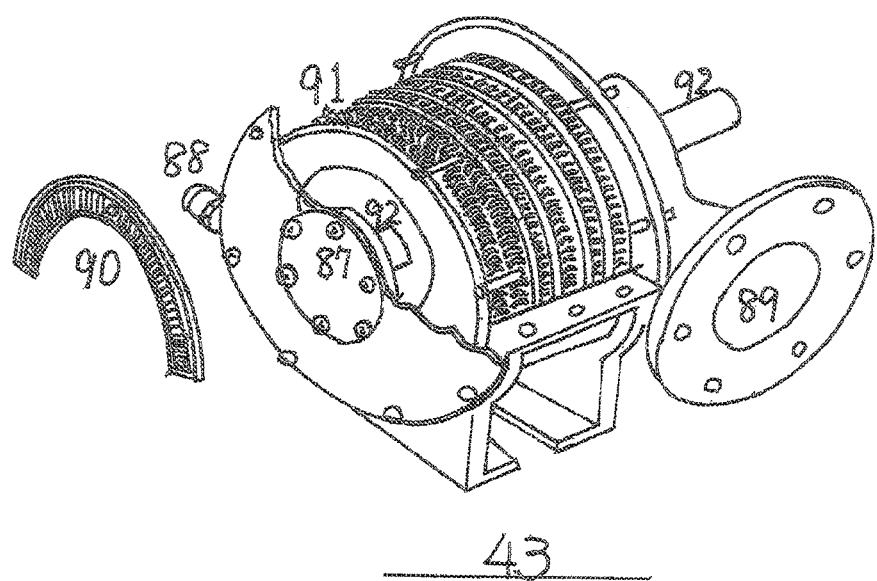
FIG. 8 shows a structure cubic diagram illustrating the shape and structure of an ultra-compact, axial-flow, multi-stage, and reaction oil-steam turbine of FIGS. 6 and 7 of the present invention.
Figure 9:
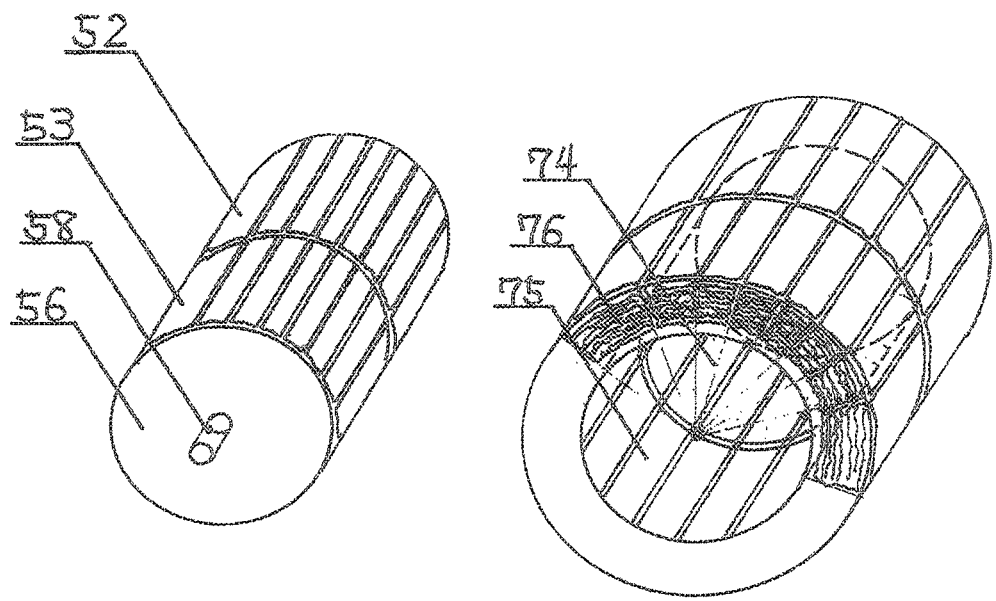
FIG. 9 shows a structure cubic diagram of the turbine generator of FIGS. 6, 7, 8, and 9 of the present invention.

In this turbine automatic power generator, the power generator FIG. 9 may include neodymium magnets 52 and 53 made of 32 poles (in two lines in the same cylinder as 16 poles), windings, and 32 poles (in two lines on the same cylinder as 16 poles) cores of 1,000 V and 10A which convert energy to energy of high-output electricity of 300,000 W or higher proportional to kinetic energy of high rotational speed 30,000 rpm or higher generated by an oil steam turbine of an ultra-compact axial-flow, multistage, and reaction type of FIG. 8.

The turbine may have high torque (rotational speed) and rotating at high speed by a flywheel of centrifugal force of a flywheel as the outer ring of a rotor blade of the turbine and by adjustment of back-pressure of a turbine exhaust port.

The turbine can be rotated at high speed and driven by an oil steam, high-temperature oil energy, and air spray pressure by a multi-pole nozzle 36 for accelerating and spraying, at air compressor high pressure, a high-temperature high-pressure steam being generated by the heat-source-adaptive heat-resistance furnace and boiler apparatus for in-house-made biomass compost pellet fuel using biomass compost pellet fuel while adding a few percent of silicon so as not to decrease lubricant oil performance just before boiling.

The present invention is also applicable to a turbine power generator air-conditioning cooling/heating apparatus, comprising: the in-house power generator obtaining a high-speed rotational force of the turbine by the boiler using, as a heat source, the heat-source-adaptive heat-resistance furnace and boiler using biomass compost pellet fuel described in any of claims 7 to 10 and claim 12, in the case where the force excessively increases to 50,000 rpm or higher, adjusting the force by automatic adjustment of decreasing the voltage of the heater in the boiler in the furnace and boiler and, further, by back-pressure adjustment, and converting the force to high-output electric energy proportional to high-speed rotational kinetic energy generated in the turbine; a heat exchanger connected to a steam exhaust port of the turbine; a refrigerant device connected to sustainable hot-water temperature retention/cooling and heating device in a state where a liquid temperature in a center pipe is retained, in which a radiation spiral-shaped pipe in a part of a hot-water heat-retaining storage having therein the radiation spiral-shaped pipe connected to the exhaust port of the heat exchanger is hermetically covered with a radiation spiral pipe having an outside diameter larger than the pipe, an internal liquid is similar to liquid in a center pipe, a double structure of a pipe container having high thermal conductivity is obtained, thereby obtaining high radiation conductivity of the liquid and an effect that heated liquid does not easily get cold, the pipe is not easily subjected to influence of fluctuation temperature in the heat-retaining storage and keeps on radiating, further, an event of replacing a large amount of cooling water in the hot water in the heat-retaining storage can be handled by a heating amount obtained by adding heating of the radiation spiral pipe of the heater in the heat-retaining storage with a temperature sensor of high-output electricity of the in-house power generator and heating of the heat-source-adaptive heat-resistance furnace and boiler using the homemade biomass compost pellet fuel, in a heater use period and when power generation is unnecessary, low-output power generation similar to an idling state of an internal combustion engine can be addressed by automatic temperature adjustment of the heater in the boiler and, further, in the case where a water supply device is unnecessary, the refrigerant is connected to a sustainable hot-water temperature retention cooling/heating device in a state where the heat of the liquid in the center pipe is retained; and an air-conditioning cooling/heating device driven by the electricity generated by the in-house power generator.

The present invention is also applicable to an energy output turbine power generation mini-plant apparatus capable of adjusting, retaining, keeping, and increasing energy of a boiler such as a boiler in a heat-source-adaptive heat-resistance furnace and boiler using biomass pellet fuel described in any of claims 7 to 10 and claims 12 and 13, by simultaneously compositely using, preferably, by coupling for general purpose, the furnace and boiler energy, an automatic electric power device, a cooling/heating air conditioner, a hot-water retaining storage, a hot-water supply device, and an in-house power generator, capable of supplying energy continuously from low speed to high speed of rotational speed of the turbine by the heater of the high-output electricity in the boiler, wherein by performing simultaneous complex, as a heat source, to fuel energy for one combustion, as one capacity, at a boiling point of the boiler of discharge of the biomass compost pellet fuel which is precious and discharged into an opening in the upper part of the heat-adaptive and heat-resistant furnace and boiler for the biomass compost pellet fuel, the energy can be converted and increased to a plurality of large capacities of energy which is millions of times as large as the fuel energy, so that even when insufficiency, forgetfulness, or the like in supply of the biomass pellet fuel source occurs, also by assistance of complex and increased energy retention represented by the hot-water retaining storage in a self-completion manner.

What is claimed is:
1. A combustion apparatus comprising:
a heat-resistant container having an opening in its upper part;
an air-holed saucer for fuel provided on the opening;
a casting grating fitted onto the opening;
a fire-extinguishing lid for opening or closing the opening;
a joint integrated with the casting grating;
a hinge for joining the casting grating and the joint swingably at a fulcrum of the casting grating and the joint;
a weight member heavier than the total weight of the casting grating, the fire-extinguisher lid, and fuel in the saucer to force the joint downward; and
a fire-extinguishing mechanism for making the heat-resistant container work as a fire-extinguishing pot by making the casting grating turn downward around the fulcrum of the hinge by hand, vibration, or impact to put the fuel drop into the heat-resistant container and then making the fire-extinguishing lid rise together with the casting grating by means of the gravity of the weight forcing the joint downward to close the opening.
2. The combustion apparatus according to claim 1, wherein the fire-extinguishing mechanism includes an aseismic device having a metal ball the moving load of which temporarily increases the weight of the casting grating side of the the fulcrum.
3. The combustion apparatus according to claim 2, wherein a mechanism for moving the metal ball manually is provided.
4. The combustion apparatus according to claim 1, wherein an air adjustment port is provided on the heat-resistant container for introducing air into the heat-resistant container to make it work also as a furnace in which the fuel dropped burns, wherein the air adjustment port is closed by the fire-extinguishing mechanism automatically.
5. The combustion apparatus according to claim 4,
wherein the fuel is a biomass pellet fuel obtained by processing dry biomass compost which is derived by fermenting biomass and whose water content is 10 to 20 weight % into a pellet shape,
and wherein a pellet-shaped capsule made of a holed metal housing an ignition agent containing polypropylene is used for igniting the fuel dropped into the heat-resistant container.
6. The combustion apparatus according to claim 1, wherein the fuel is a biomass pellet fuel obtained by processing dry biomass compost which is derived by fermenting biomass and whose water content is 10 to 20 weight % into a pellet shape.

* * * * *